Oct. 13, 1942.  R. F. DAVISSON  2,298,551
BACK WATER VALVE
Filed Oct. 29, 1941

Inventor
R. F. Davisson
By H. Davisson & Co.
Attorneys

Patented Oct. 13, 1942

2,298,551

UNITED STATES PATENT OFFICE 2,298,551

BACK WATER VALVE

Russell F. Davisson, Tulsa, Okla.

Application October 29, 1941, Serial No. 417,043

1 Claim. (Cl. 182—17)

In the drains commonly provided for basement floors and the like, a ball valve or a swinging arm valve is often employed to automatically close and prevent back-flow of water in case of high water in the sewer. Often, however, due to low back water pressure and/or accumulation of foreign matter on the seat and/or valve, the valve may fail to tightly close, with the result that the basement or the like is soon flooded. Moreover, after the sewer water has receded, it is often necessary to force the back-flow valve off of its seat to allow the drain to again function, the valve being frequently injured by such procedure and, therefore, prevented from later seating accurately and tightly.

Due to such drawbacks as those above explained for automatic valves, a great many installations do not have such valves, but rely upon manually threading a screw plug into the inlet end of the trap to prevent back flow of water, but even if the plug can be found at the moment needed, it is necessary to remove the strainer plate and usually necessary to clean away accumulated trash before said plug can be threaded into place, and even then, the plug can be started only with difficulty in the great majority of cases. In the meantime, the basement or the like may be partly flooded.

My invention aims to provide a new and improved structure in which a screw plug for preventing back flow remains threaded in a sleeve in the receiving bowl of the drain below the strainer, and may be quickly and easily screwed down, unhindered by any accumulated trash, to instantly stop back-flow when required, said plug being operable by a key or the like insertible through an opening in the strainer.

With the foregoing in view, the invention resides in the novel subject matter hereinafter described and claimed, description being accomplished by reference to the accompanying drawing.

Figure 1:
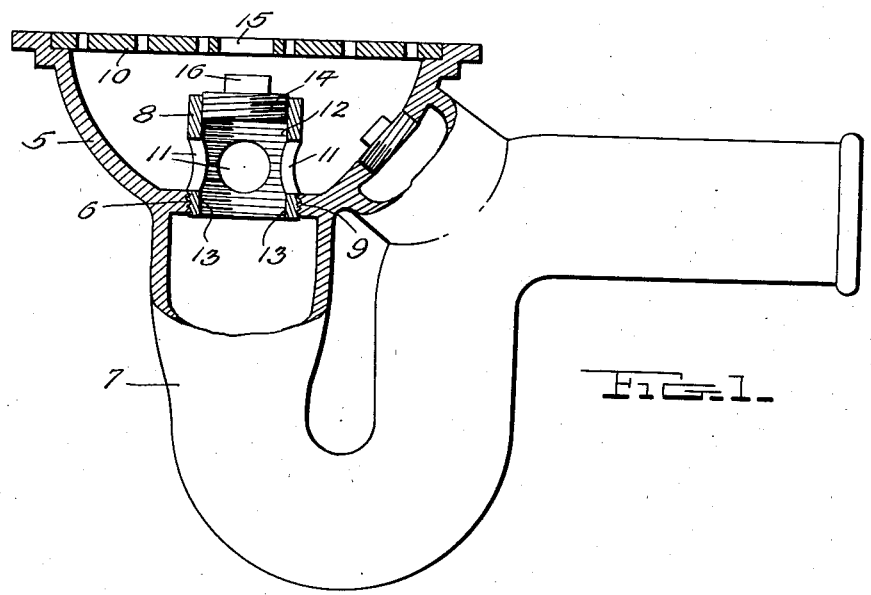
Fig. 1 is a side elevation partly in section showing a floor drain and trap improved in accordance with the invention, the back-flow-valve being shown in its normal open position.
Figure 3:
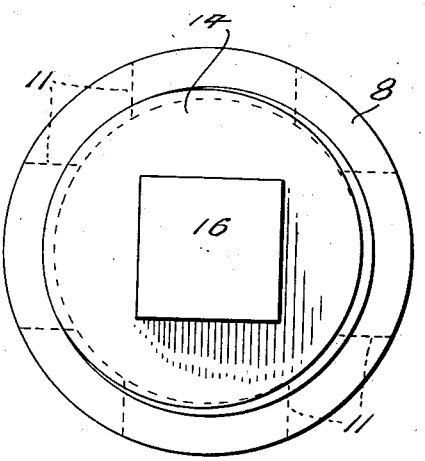
Fig. 3 is a top plan view of the sleeve and plug.
Figure 2:
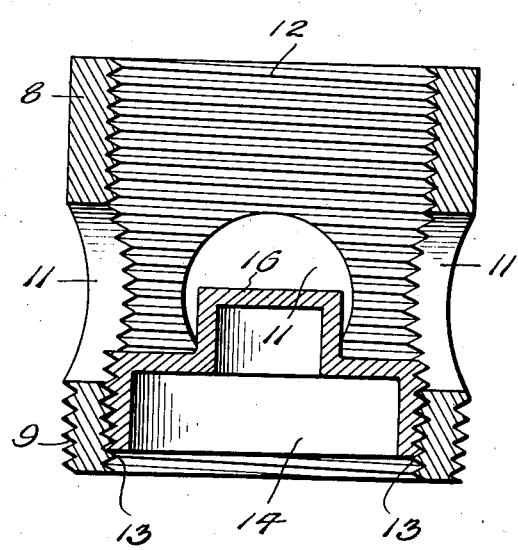
Fig. 2 is an enlarged vertical sectional view through the screw plug and the sleeve in which it is mounted, showing the plug threaded down to the lower end of said sleeve to prevent back flow of water.

A water-receiving bowl 5 is shown in Fig. 1, to be set into the floor of a basement or the like, the bottom of said bowl being formed with the usual opening 6. This opening communicates with the inlet end of the trap 7 and the wall of said opening is threaded, the threads being provided in the standard drain for the direct reception of a screw plug, such as that above mentioned. In carrying out my invention, however, I provide a vertical sleeve 8 for engagement with the opening 6, said sleeve having an external screw thread 9 at its lower end to fluid-tightly engage the thread on the side wall of said opening, thus providing for rigidly mounting the sleeve 8 within the bowl 5 under the usual strainer 10.

Water-conducting openings 11 are formed in the sleeve 8 with their lower edges about flush with the bottom of the bowl 5, and the combined area of these openings is preferably equal to or somewhat greater than the cross-sectional conducting area of said sleeve. There are preferably rather few of these openings and they are of substantial size so that any trash entering the bowl 5 through the strainer 10 may pass on into the trap 7.

The sleeve 8 is provided with an internal screw thread 12 from its upper to its lower end, and said sleeve is internally tapered downwardly to a slight extent below the openings 11, as indicated at 13. A conventional screw plug 14 is screwed into the sleeve 8 and has a loose fit therein except when screwed downwardly into the tapered lower end 13 of said sleeve. The plug 14 normally occupies a position in the sleeve 8 above the openings 11, as seen in Fig. 1, in which position it is readily accessible to a key, socket wrench or the like insertible downwardly through an opening 15 in the strainer 10. Due to the loose fit of the plug 14, it may be quickly and easily screwed down and tightly wedged into the tapered lower end 13 of the sleeve to fluid-tightly close this sleeve below the openings 11 and prevent any back flow of water from occurring. Any trash which may accumulate on the edge walls of the openings 11 will be sheared off by the plug 14 while the latter is being screwed down to its operative position and consequently no such trash can interfere with tight closing of the valve.

A square lug 16 is shown on top of the plug 14 to be engaged by the key, wrench or the like but it will be understood that if desired, said plug could be provided with a kerf to be engaged by a screw driver or similar tool.

The present invention differs from other valves in that it has a threaded vertical seat with metal contact of seat and valve, whereas other valves usually have rubber-to-metal contact which so often causes sticking. The present valve has a much lower original cost for material and may be installed with less expense than other valves due to its extremely simple two-part construction. The valve has a threaded plug and no large area exposed to collection of trash when the valve is open, and in valve-open position, the plug remains entirely above the flow of water. Any trash which may possibly catch in the openings of the sleeve will be sheared off by the plug valve when the latter is screwed down, and obviously when the valve is closed, insects are prevented from reaching the polluted sewer water or the like.

From the foregoing, taken in connection with the accompanying drawing, it will be seen that novel and advantageous provision has been made for carrying out the object of the invention. The construction shown has proven to be advantageous from all standpoints and is preferably followed, but within the scope of the invention as claimed, minor variations may of course be made.

Obviously, any desired material or materials may be employed, for example, bronze.

I claim:

A back water valve for a floor drain trap, comprising a one-piece cylindrical sleeve open at both its upper and lower ends, said sleeve having an external screw thread at its lower end for mounting it in the inlet end of the trap, said sleeve having circumferentially spaced water conducting openings directly above said external screw thread, said sleeve having an internal screw thread from end to end and being downwardly tapered internally below said openings, and a screw plug threaded into said sleeve and having a loose fit therein except when threaded downwardly into said tapered lower end of said sleeve, said plug normally occupying a position in said sleeve above said openings but being tightly receivable in said tapered lower end of said sleeve to prevent back-flow when required.

RUSSELL F. DAVISSON.